US012661781B2

(12) United States Patent
Darnel et al.

(10) Patent No.: US 12,661,781 B2
(45) Date of Patent: Jun. 23, 2026

(54) MAGNETIC CONNECTION SYSTEM FOR A MULTI-AXIS GRIPPER OF A LAB AUTOMATION ROBOT

(71) Applicant: THERMO CRS LTD., Burlington (CA)

(72) Inventors: Gary Darnel, Hamilton (CA); Michael Paul Riff, Burlington (CA); Jonathan Wittchen, Burlington (CA); Rob Dunn-Dufault, Burlington (CA); Stephen Wayne Johnson, Burlington (CA)

(73) Assignee: THERMO CRS LTD., Burlington (CA)

( * ) Notice: Subject to any disclaimer, the term of this patent is extended or adjusted under 35 U.S.C. 154(b) by 216 days.

(21) Appl. No.: 18/679,110

(22) Filed: May 30, 2024

(65) Prior Publication Data

US 2024/0399569 A1 Dec. 5, 2024

Related U.S. Application Data

(60) Provisional application No. 63/505,388, filed on May 31, 2023.

(51) Int. Cl.
*B25J 9/16* (2006.01)
*B25J 9/12* (2006.01)
(Continued)

(52) U.S. Cl.
CPC ............. *B25J 9/1612* (2013.01); *B25J 9/123* (2013.01); *B25J 9/1653* (2013.01); *B25J 13/088* (2013.01);
(Continued)

(58) Field of Classification Search
None
See application file for complete search history.

(56) References Cited

U.S. PATENT DOCUMENTS 4,062,455 A 12/1977 Flatau
4,068,156 A 1/1978 Johnson et al.
(Continued)

FOREIGN PATENT DOCUMENTS

WO 2016123083 A1 8/2016

OTHER PUBLICATIONS

European Patent Office, Extended European Search Report, Application No. 20197647.9, mailed Feb. 23, 2021 (10 pages).
(Continued)

*Primary Examiner* — Arslan Azhar
(74) *Attorney, Agent, or Firm* — Michael Best & Friedrich LLP

(57) ABSTRACT

A lab automation robot includes a base, a tower rotatably coupled to the base, an arm translatable relative to the tower, a forearm rotatably coupled to the arm, and a wrist assembly rotatably coupled to the forearm about a wrist joint. The wrist assembly includes an end effector including a first magnet, a cap including a second magnet, a gripper pivotably coupled to the end effector, a linear actuator carried by the gripper, and a sensor carried by the gripper. The linear actuator adjusts a position of the gripper relative to the end effector. The linear actuator is coupled to the cap. The sensor detects an orientation of the gripper relative to the end effector. In response to the first and second magnets decoupling, the sensor detects an orientation of the gripper relative to the end effector outside of a predetermined operational range and terminate operation of the linear actuator.

20 Claims, 8 Drawing Sheets

(51) Int. Cl.
    *B25J 13/08*         (2006.01)
    *B25J 15/00*         (2006.01)
    *B25J 15/06*         (2006.01)

(52) U.S. Cl.
    CPC ....... *B25J 15/0028* (2013.01); *B25J 15/0608*
                    (2013.01)

(56)         References Cited

U.S. PATENT DOCUMENTS

| | | | |
|---|---|---|---|
| 4,529,237 | A | 7/1985 | Gupta et al. |
| 4,661,039 | A | 4/1987 | Brenholt |
| 4,676,541 | A | 6/1987 | Lord et al. |
| 4,693,663 | A | 9/1987 | Brenholt et al. |
| 4,784,422 | A | 11/1988 | Jones et al. |
| 4,806,066 | A | 2/1989 | Rhodes et al. |
| 4,828,453 | A | 5/1989 | Martin et al. |
| 5,116,190 | A | 5/1992 | Silke |
| 5,256,128 | A | 10/1993 | Neumann |
| 5,511,147 | A | 4/1996 | Abdel-Malek |
| D496,478 | S | 9/2004 | Wu |
| 8,141,924 | B2 | 3/2012 | Albin |
| 8,176,808 | B2 | 5/2012 | Fisk et al. |
| 8,206,144 | B2 | 6/2012 | Ng et al. |
| 8,242,730 | B2 | 8/2012 | Nichols et al. |
| 8,322,249 | B2 | 12/2012 | Seavey et al. |
| 8,414,043 | B2 | 4/2013 | Albin et al. |
| 8,442,686 | B2 | 5/2013 | Saito et al. |
| 8,614,559 | B2 | 12/2013 | Kassow et al. |
| 9,026,250 | B2 | 5/2015 | Summer et al. |
| 9,149,927 | B2 | 10/2015 | Sturm |
| 9,409,292 | B2 | 8/2016 | Smith et al. |
| 9,555,545 | B2 | 1/2017 | Linnell et al. |
| 9,701,018 | B2 | 7/2017 | Linnell et al. |
| 9,746,447 | B2 | 8/2017 | Fetzer et al. |
| 9,827,677 | B1 | 11/2017 | Gilbertson et al. |
| 9,827,678 | B1 | 11/2017 | Gilbertson et al. |
| 10,112,303 | B2 | 10/2018 | Vakanski et al. |
| 10,272,573 | B2 | 4/2019 | Tan et al. |
| 11,254,015 | B2 | 2/2022 | Riff et al. |
| 2003/0130759 | A1 | 7/2003 | Kesil et al. |
| 2005/0016313 | A1 | 1/2005 | Robertson et al. |
| 2009/0173177 | A1 | 7/2009 | Sugawara et al. |
| 2010/0101356 | A1 | 4/2010 | Albin |
| 2012/0061155 | A1 | 3/2012 | Berger et al. |
| 2012/0065779 | A1 | 3/2012 | Yamaguchi et al. |
| 2013/0076055 | A1 | 3/2013 | Hino et al. |
| 2013/0341946 | A1 | 12/2013 | Yamanaka |
| 2014/0007731 | A1 | 1/2014 | Hosek et al. |
| 2015/0035303 | A1 | 2/2015 | Klang |
| 2015/0336699 | A1 | 11/2015 | Fahldieck |
| 2016/0176048 | A1* | 6/2016 | Zimmermann ........ B25J 9/1664 |
| | | | 901/46 |
| 2016/0252894 | A1 | 9/2016 | Kram et al. |
| 2017/0326737 | A1 | 11/2017 | Martin et al. |
| 2017/0341233 | A1* | 11/2017 | Keller ................. G05B 19/409 |
| 2018/0009111 | A1 | 1/2018 | Ho et al. |
| 2022/0110705 | A1* | 4/2022 | Hourtash .............. A61B 34/30 |

OTHER PUBLICATIONS

International Search Report and Written Opinion for Application No. PCT/IB2024/055320 dated Aug. 23, 2024 (7 pages).

\* cited by examiner

MAGNETIC CONNECTION SYSTEM FOR A MULTI-AXIS GRIPPER OF A LAB AUTOMATION ROBOT

CROSS-REFERENCE TO RELATED APPLICATION

This application claims priority to U.S. Provisional Application No. 63/505,388, which was filed on May 31, 2023 and entitled "Magnetic Connection System for a Multi-Axis Gripper of a Lab Automation Robot", the contents of which is herein incorporated by reference in its entirety.

FIELD

The present disclosure relates to automated laboratory systems. More specifically, the present disclosure relates to a magnetic assembly configured to magnetically position a gripper relative to an end effector. In response to a force that can lead to system damage, the magnetic assembly is configured to decouple the gripper from the end effector, which positions the gripper out of alignment with the end effector. This results in a pause in operation before system damage occurs.

SUMMARY

In one example of an embodiment, a lab automation robot includes a base, a tower rotatably coupled to the base, an arm translatable relative to the tower, a forearm rotatably coupled to the arm, and a wrist assembly rotatably coupled to the forearm about a wrist joint. The wrist assembly includes an end effector including a first magnet, a cap including a second magnet, a gripper pivotably coupled to the end effector, a linear actuator carried by the gripper, and a sensor carried by the gripper. The second magnet is configured to magnetically couple to the first magnet by a magnetic force. The linear actuator is configured to adjust a position of the gripper relative to the end effector. A portion of the linear actuator extends through the end effector and is coupled to the cap. The sensor is configured to detect an orientation of the gripper relative to the end effector. In response to the first magnet and the second magnet decoupling, the sensor is configured to detect an orientation of the gripper relative to the end effector outside of a predetermined operational range and terminate operation of the linear actuator.

In another example of an embodiment, a lab automation robot includes a wrist assembly configured to move in at least three directions. The wrist assembly includes an end effector, a gripper pivotably coupled to the end effector, a first linear actuator and a second linear actuator, a first cap magnetically connected to the end effector, a second cap magnetically connected to the end effector, a sensor assembly carried by the gripper, and a controller in communication with the sensor assembly. The first and second linear actuators are carried by the gripper. The first cap and end effector cooperatively define a first aperture. A portion of the first linear actuator is received by the first aperture. The second cap and end effector cooperatively define a second aperture. A portion of the second linear actuator is received by the second aperture. The sensor assembly is configured to detect an orientation of the gripper relative to the end effector. In response to a detected orientation of the gripper relative to the end effector being outside of predetermined operational range, the controller is configured to terminate operation of the first and second linear actuators. In response to the detected orientation of the gripper relative to the end effector being outside of predetermined operational range at least one of the magnetic connection between the first cap and the end effector or the magnetic connection between the second cap and the end effector is decoupled.

Other aspects of the invention will become apparent by consideration of the detailed description and accompanying drawings.

Figure 1:
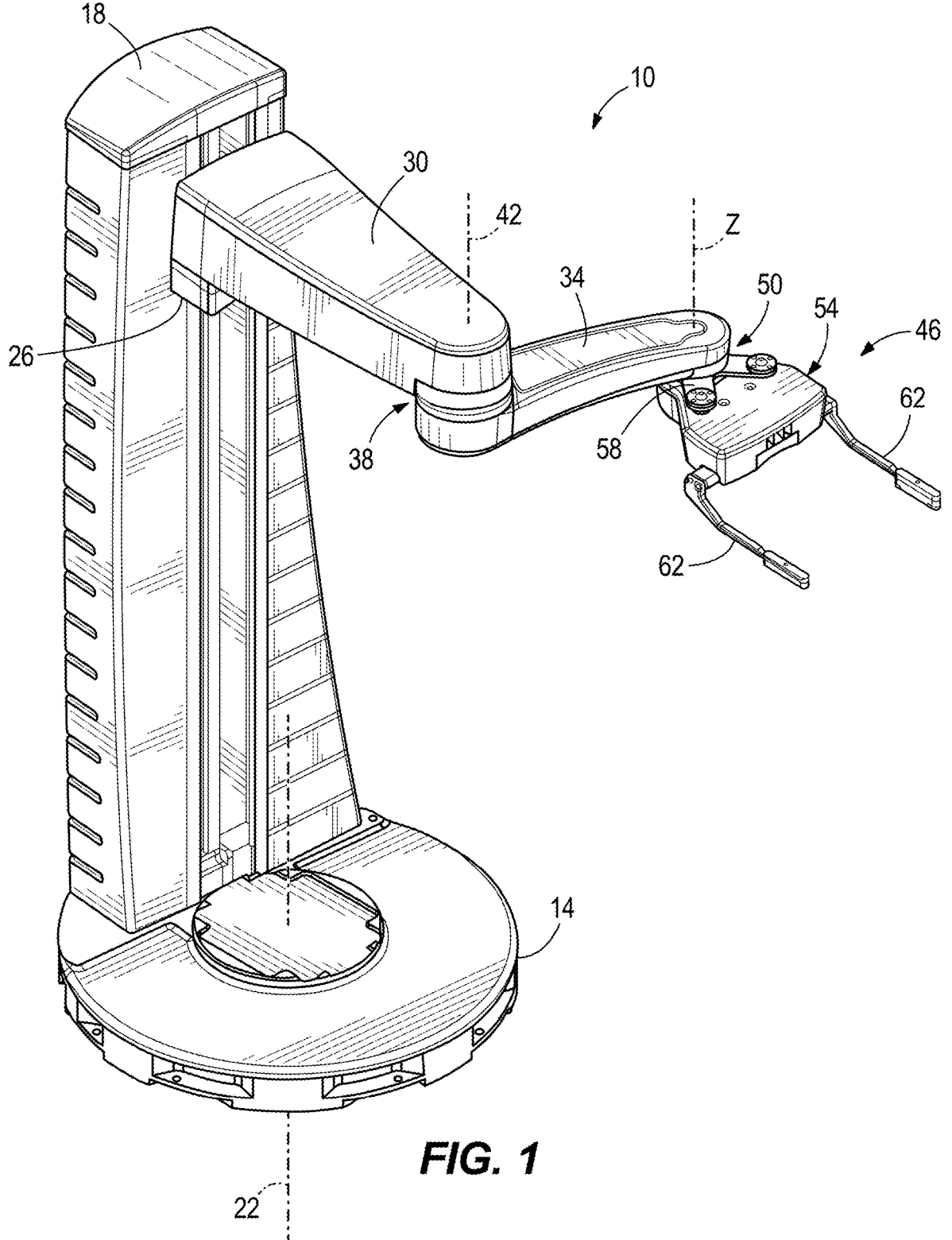
FIG. 1 is a perspective view of a laboratory robot.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

The illustrated embodiment includes a robotic device 10 including a wrist assembly 46. The wrist assembly 46 is rotatable by a wrist joint 50. The wrist assembly 46 is configured to grasp and move a component such as a microtiter plate. The wrist assembly 46 includes a gripper assembly 54, an end effector 58, and magnetic connection systems 114*a*, 114*b*. The gripper assembly 54 is configured to rotate relative to the end effector 58 by one or more motors 122*a*, 122*b*. A first sensor 206*a* and a second sensor 206*b* is positioned within the gripper assembly 54. The sensors 206*a*, 206*b* are configured to determine the distance between the gripper assembly 54 and the end effector 58 and transmit the distance to a controller. During operation, an impact situation can occur in which the gripper assembly 54 is out of alignment with the end effector 58. The impact situation can cause several undesirable outcomes such as damage the motors 122*a*, 122*b*, damage the wrist joint 50, etc. To prevent the undesirable outcomes, the impact situation moves the magnetic connection system 114*a*, 114*b* out of alignment. Additionally, the sensors 206*a*, 206*b* and controller pause operation before damage can occur.

FIG. 1 illustrates an example of the laboratory robot or robotic device 10 configured to perform at least one scientific process (e.g., an assay, a polymerase chain reaction, etc.). The robotic device 10 (also referred to as a lab automation robot 10) can be a SCARA type robotic device, such as that sold by Thermo Fisher Scientific, Inc. under the trademark Spinnaker XT. Other types of robotic devices can be used, such as an articulated robotic device, a spider robotic device, or any other suitable types of robotic device. The illustrated robotic device 10 includes a base 14. A tower 18 is rotatably coupled to the base 14 about a first vertical axis 22. An elevator 26 is movably coupled to the tower 18. The elevator 26 is linearly movable relative to the tower 18 in a direction parallel with the first vertical axis 22. An arm 30 is coupled to the elevator 26. The arm 30 is movable with the elevator 26. The robotic device 10 further includes an articulating forearm 34 rotatably coupled to the arm 30 at an elbow joint 38. The elbow joint 38 defines a second vertical axis 42. The second vertical axis 42 is laterally offset and oriented parallel to the first vertical axis 22. The wrist assembly 46 is rotatably coupled to the forearm 34 at the wrist joint 50. The wrist joint 50 defines a third vertical axis Z (also referred to as a yaw axis Z). The yaw axis Z is laterally offset and oriented parallel to the first and second vertical axes 22, 42. The wrist assembly 46 includes a multi-axis gripper 54 (also referred to as the gripper assembly 54) and the end effector 58. The end effector 58 is coupled to and rotatable with the wrist joint 50. The gripper 54 is pivotably coupled to the end effector 58. A pair of fingers 62 are coupled to the gripper 54. The fingers 62 extend from the gripper 54 in a direction away from the wrist joint 50. The fingers 62 are configured to be moved toward each other (and/or away from each other) for selectively gripping and releasing laboratory equipment (e.g., a micro-titer plate, a reagent dispenser, etc.). The fingers 62 can be, for example, moved in a direction perpendicular to the yaw axis Z.

Figure 2:
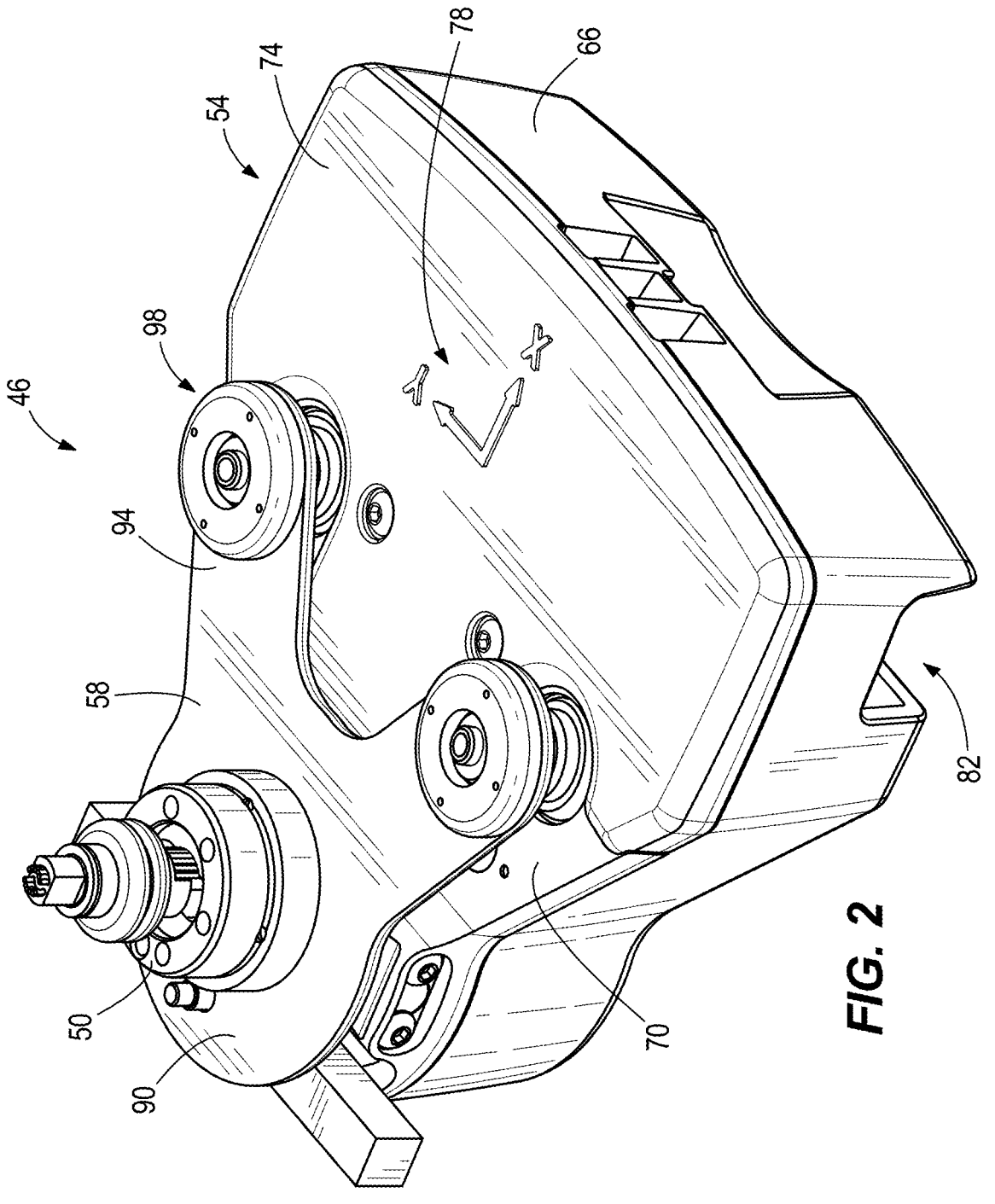
FIG. 2 is a perspective view of a wrist assembly and a wrist joint associated with the laboratory robot of FIG. 1.
Figure 4:
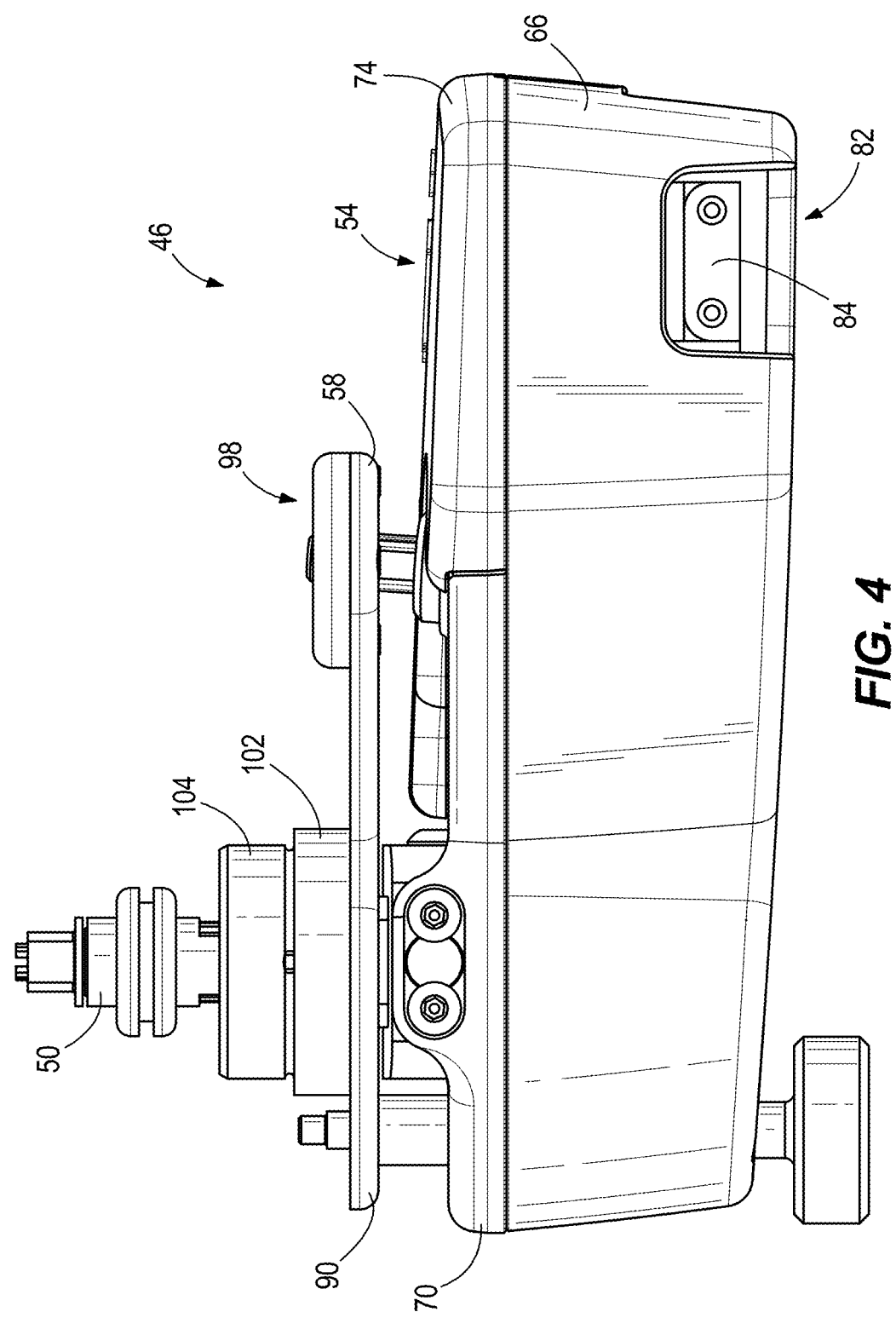
FIG. 4 is a side view of the wrist assembly and wrist joint of FIG. 2.

With reference to FIG. 2, the illustrated gripper assembly 54 includes a housing 66. A frame 70 (or a body 70) is coupled to and partially received within the housing 66. A top cover 74 is coupled to the housing 66 and the body 70. The top cover 74 can include indicia 78 provided to identify an orientation of the gripper 54. The illustrated housing 66 includes a pair of lateral cutouts 82 (only one is shown) respectively positioned on opposing sides of the housing 66. As shown in FIG. 4, a finger mount 84 of the body 70 is accessible through each lateral cutout 82. Each finger 62 (shown in FIG. 1) is configured to extend through a respective lateral cutout 82 and couple to the respective finger mount 84.

Figure 3:
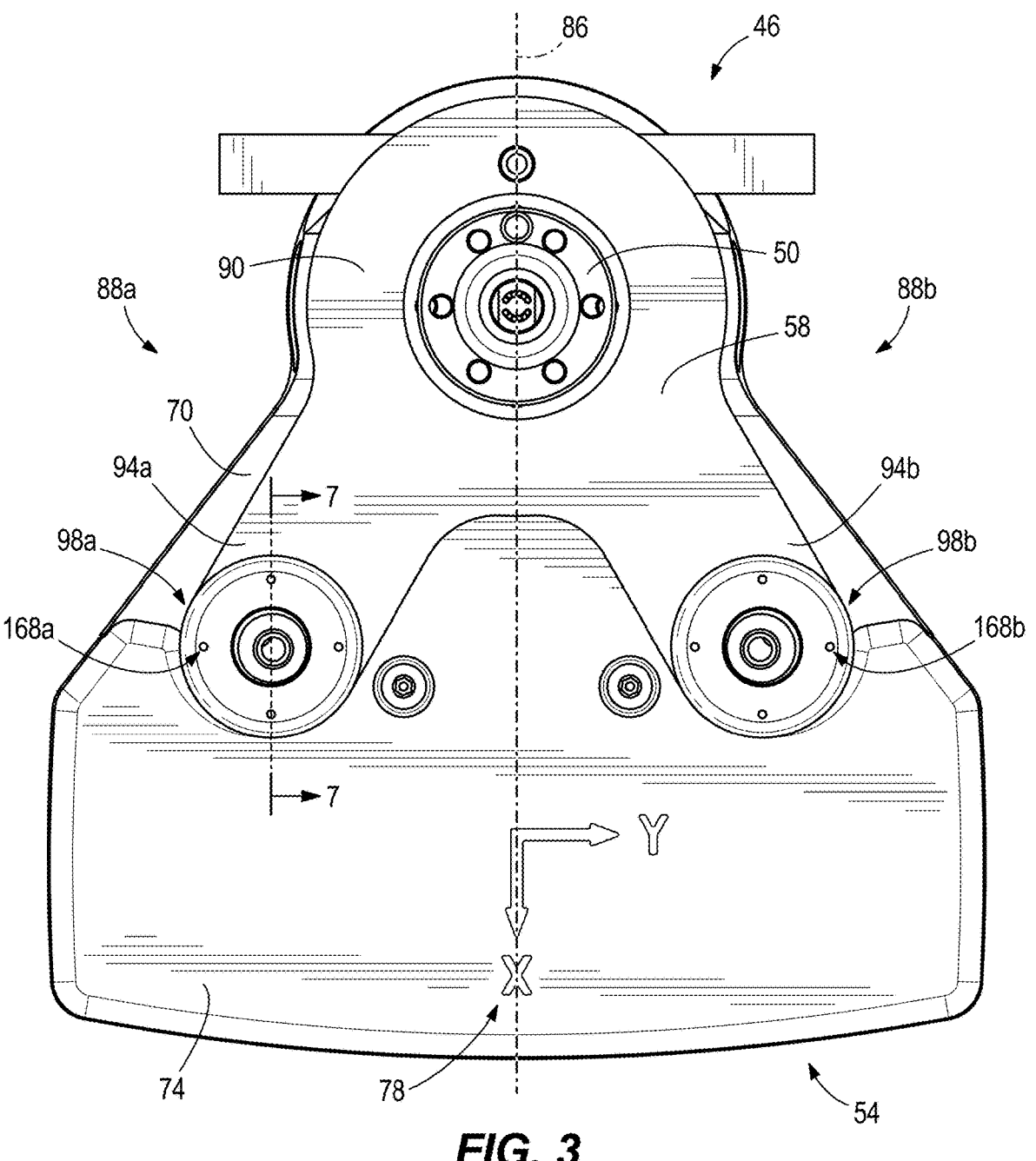
FIG. 3 is a top view of the wrist assembly and wrist joint of FIG. 2.

With reference now to FIG. 3, the wrist assembly 46 is symmetrical about a longitudinal axis 86 (with an exception to the indicia 78, electronic components, etc.). As such, the longitudinal axis 86 divides the wrist assembly 46 into a first side 88a and a second side 88b opposite the first side 88a. Components on the first side 88a will be discussed herein with a suffix 'a,' and components on the second side 88b will be discussed herein with a suffix 'b.' For brevity, some components may be explained with reference to only the first side 88a. It should be appreciated that the second side 88b also includes an identical component.

With continued reference to FIG. 3, the end effector 58 defines a generally Y-shaped plate. The Y-shaped plate is symmetrical about the longitudinal axis 86. The Y-shaped plate includes a base portion 90, a first prong portion 94a (also referred to as a first prong 94a), and a second prong portion 94b (also referred to as a second prong 94b). The first prong portion 94a extends outwardly from the base portion 90 on the first side 88a. The second prong portion 94b extends outwardly from the base portion 90 on the second side 88b.

With continued reference to FIG. 3, the end effector 58 is coupled to the gripper 54 by the wrist joint 50, a first linear actuator assembly 98a, and a second linear actuator assembly 98b. The first linear actuator assembly 98a extends through and is coupled to the first prong portion 94a. The second linear actuator assembly 98b extends through and is coupled to the second prong portion 94b. In addition, each linear actuator assembly 98a, 98b is coupled to the body 70 (shown in FIG. 7). The gripper 54 is pivotable relative to the end effector 58 by the linear actuator assemblies 98a, 98b.

As best illustrated in FIG. 4, the wrist joint 50 includes a lower portion 102 and an upper portion 104. The lower portion 102 is coupled to the base portion 90 and the gripper 54. The upper portion 104 is configured to be coupled to a corresponding bore (not shown) in a lower surface of the forearm 34 (shown in FIG. 1). The lower portion 102 is configured to rotate relative to the upper portion 104. The gripper assembly 54 and the end effector 58 rotate with the lower portion 102, which facilitates rotation of the gripper assembly 54 and the end effector 58 relative to the forearm 34.

Figure 5:
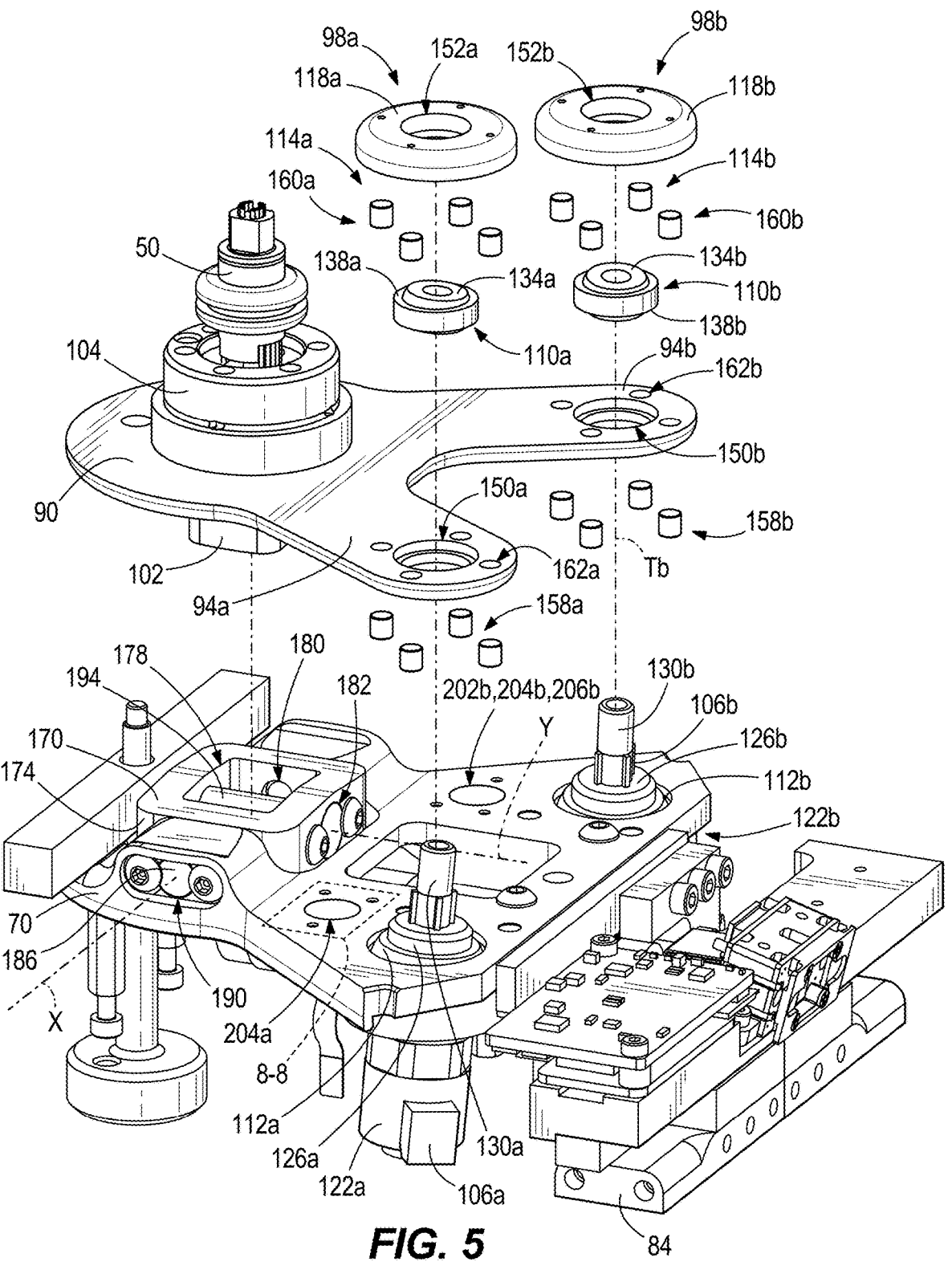
FIG. 5 is an exploded view of the wrist assembly and wrist joint of FIG. 2 with a housing and a top cover of the wrist assembly removed.
Figure 7:
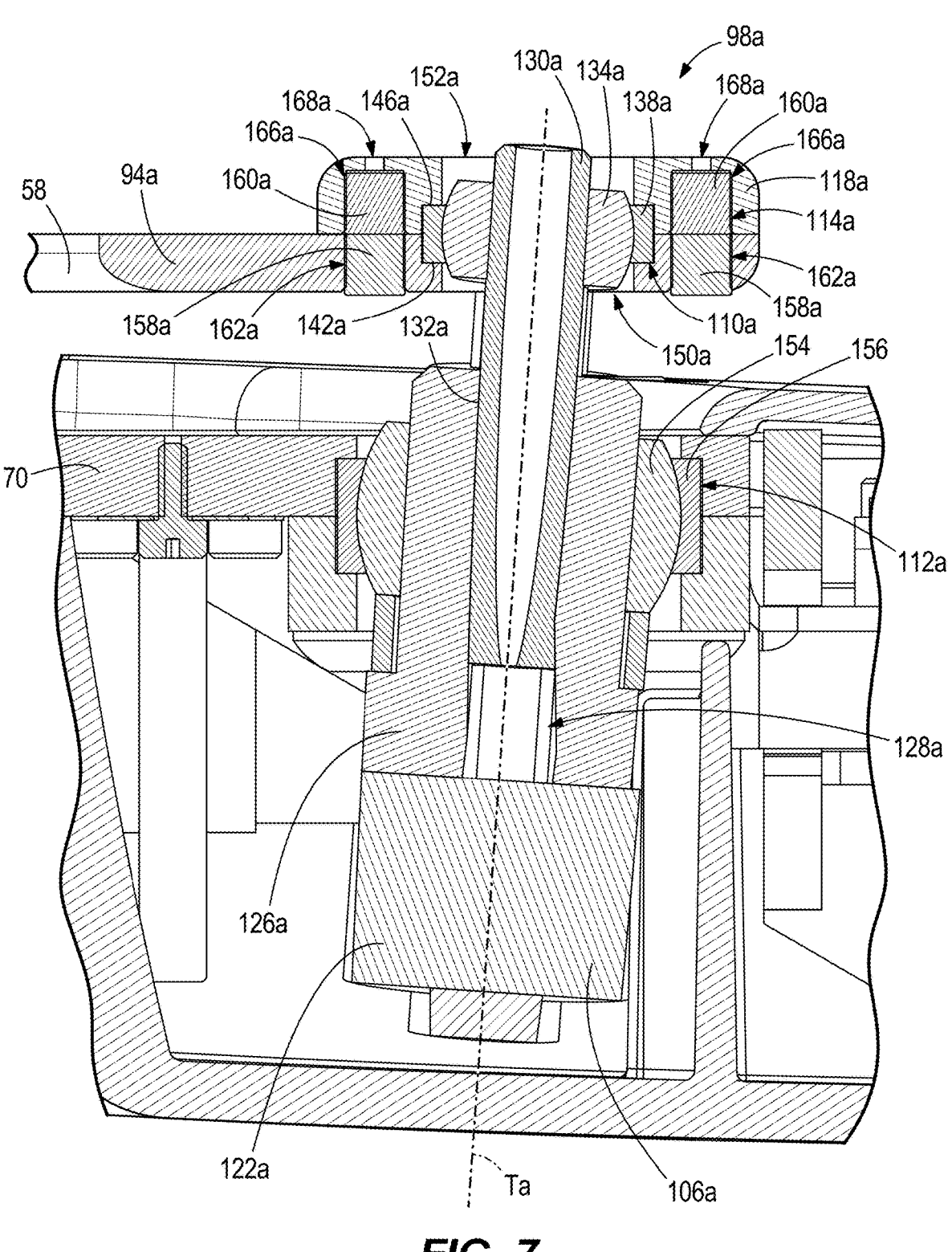
FIG. 7 is a cross-section view of a linear actuator assembly of the wrist assembly of FIG. 2 taken along line 7-7 in FIG. 3.

With reference to FIGS. 5 and 7, the first linear actuator assembly 98a includes a linear actuator 106a, an upper spherical bearing 110a (also referred to as a first bearing 110a), a lower spherical bearing 112a (also referred to as a second bearing 112a), the magnetic connection system 114a, and a cap 118a. The linear actuator 106a includes the motor 122a, a housing 126a, and a drive shaft 130a. With specific reference to FIG. 7, the housing 126a includes a threaded bore 128a. The drive shaft 130a includes a threaded portion 132a. The drive shaft 130a is received by the threaded bore 128a, with the threaded portion 132a in threaded engagement with the threaded bore 128a. The drive shaft 130a is configured to be rotated by the motor 122a. Rotation of the drive shaft 130a results in linear actuation of the drive shaft 130a along a translation axis Ta, as the threaded portion 132a translates relative to the threaded bore 128a. Linear actuation of the drive shaft 130a causes the body 70 to move (raise or lower) relative to the end effector 58. The upper spherical bearing 110a includes an inner race 134a and an outer race 138a. The inner race 134a is coupled to the drive shaft 130a. The inner race 134a is configured to rotate with the drive shaft 130a relative to the outer race 138a. The outer race 138a is sandwiched between a prong counterbore 142a and a cap counterbore 146a. The prong counterbore 142a is positioned around a prong aperture 150a on an end of the prong portion 94a. The cap counterbore 146a is positioned around a central cap aperture 152a that extends through the cap 118a. The prong aperture 150a and the central cap aperture 152a cooperatively define a first aperture (not shown). The drive shaft 130a at least partially extends through the first aperture. The outer race 138a of the upper spherical bearing 110a is coupled to the cap counterbore 146a. As such, the upper spherical bearing 110a is configured to move with the linear actuator 106a and the cap 118a away from the end effector 58 during the impact situation, which is described in further detail below. The lower spherical bearing 112a also includes an inner race 154a and an outer race 156a. The inner race 154a is coupled to the housing 126a. The outer race 156a is coupled to the body 70. The inner race 154a is configured to rotate relative to the outer race 156a to change the position of the translation axis Ta as the end effector 58 is pivoted. It should be appreciated that each linear actuator 106a, 106b is carried by the gripper 54.

With continued reference to FIG. 7 (which shows the linear actuator assembly 98a), the first linear actuator 106a and the second linear actuator 106b can be selectively actuated (e.g., by a controller, by a button, etc.) independently of each other. The upper and lower spherical bearings

110*a*, 110*b*, 112*a*, 112*b* permit changes in angular alignment of the translation axes Ta, Tb (translation axis Tb shown in FIG. 5) of the linear actuators 106*a*, 106*b* (relative to the yaw axis Z) as the linear actuators 106*a*, 106*b* are extended or retracted. The angular alignment of each translation axis Ta, Tb is adjusted as the drive shafts 130*a*, 130*b* move relative to the housings 126*a*, 126*b*. The movement of the body 70 relative to the end effector 58 causes the adjustment in alignment of the translation axes Ta, Tb. As such, each linear actuator assembly 98*a*, 98*b* is configured to accommodate various movements of the body 70 relative to the end effector 58. The gripper 54 is further rotatable relative to at least the forearm 34 by the linear actuators 106*a*, 106*b* about a first horizontal axis or "roll axis" Y and about a second horizontal axis or "pitch axis" X (shown in FIG. 5), which is described in further detail below.

Figure 6:
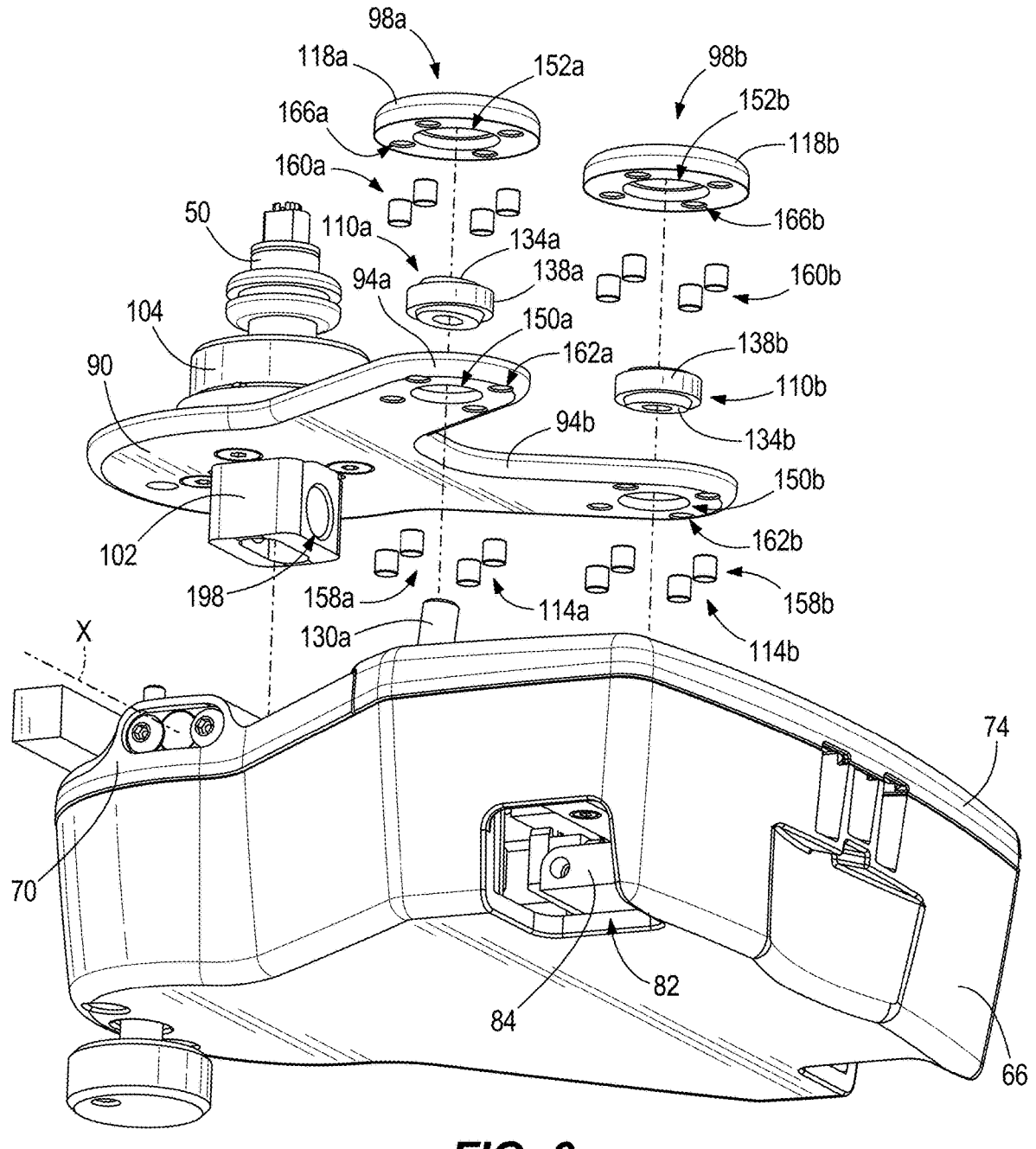
FIG. 6 is another exploded view of the wrist assembly of FIG. 2.

With reference to FIGS. 5 and 6, the magnetic connection system 114*a* includes at least one magnet. The illustrated magnetic connection system 114*a* includes a plurality of magnets. More specifically, the illustrated magnetic connection system 114*a* includes a plurality of prong magnets 158*a* and a plurality of cap magnets 160*a*. Each prong magnet 158*a* (or first magnet 158*a*) is received in a respective prong magnet retainer 162*a* in the first prong portion 94*a*. The prong magnet retainers 162*a* are apertures extending through the first prong portion 94*a*. In one or more examples of embodiments, the prong magnet retainers 162*a* extend partially through the first prong portion 94*a*. The number of prong magnet retainers 162*a* corresponds to the number of prong magnets 158*a* in the magnetic connection system 114*a*. In the illustrated embodiment, the first prong portion 94*a* includes four prong magnet retainers 162*a*. The prong magnet retainers 162*a* are evenly spaced around the prong aperture 150*a*. Each cap magnet 160*a* (or second magnet 160*a*) is received in a respective cap magnet retainer 166*a* in the cap 118*a* (shown in FIG. 6). The cap magnet retainers 166*a* are recesses extending into the cap 118*a*. In one or more examples of embodiments, the cap magnet retainers 166*a* extend through the cap 118*a*. The number of cap magnet retainers 166*a* corresponds to the number of cap magnets 160*a* in the magnetic connection system 114*a*. In the illustrated embodiment, the cap 118*a* includes four cap magnet retainers 166*a*. The cap magnet retainers 166*a* are evenly spaced around the central cap aperture 152*a*.

The robotic device 10 includes the same number of prong magnet retainers 162*a* and cap magnet retainers 166*a*. The prong and cap magnets 158*a*, 160*a* are oriented such that each of the cap magnets 160*a* are configured to magnetically attract (or form a magnetic connection) to a corresponding prong magnet 158*a*. The magnetic attraction or magnetic force between the prong and cap magnets 158*a*, 160*a* causes the prong magnet retainers 162*a* and the cap magnet retainers 166*a* to align. In other embodiments, the robotic device 10 can include fewer or more prong and cap magnets 158*a*, 160*a* (e.g., two, three, five, six, etc.). As such, the robotic device can include fewer or more prong and cap magnet retainers 162*a*, 166*a* to correspond with the number of prong and cap magnets 158*a*, 160*a*. The number or size of prong and cap magnets 158*a*, 160*a* can be adjusted to achieve any suitable magnetic force. In other embodiments, the prong and cap magnet retainers 162*a*, 166*a* can be unevenly spaced around the prong aperture 150*a* and central cap aperture 152*a*, respectively. In these embodiments, the prong and cap magnet retainers 162*a*, 166*a* are still configured to be aligned with each other.

During normal operation of the robotic device 10, force is generated by the drive shaft 130*a* as the linear actuator 106*a* is actuated. More specifically, rotation of the drive shaft 130*a* will create a rotational force, and linear actuation of the drive shaft 130*a* will create a linear force. As the inner race 134*a* rotates with the drive shaft 130*a*, a portion of the rotational force may be transferred to the outer race 138*a* (by friction). Since the cap 118*a* is coupled to the outer race 138*a*, the cap 118*a* will receive the rotational force. However, the magnetic force between the prong and cap magnets 158*a*, 160*a* is sufficient to prevent the cap 118*a* from being misaligned with the first prong portion 94*a*. The linear actuation of the drive shaft 130*a* creates the linear force upon the cap 118*a* (by the upper spherical bearing 110*a*). The linear force pushes the cap 118*a* away from the first prong portion 94*a* when the drive shaft 130*a* is being extended from the housing 126*a*. However, the magnetic force between the prong and cap magnets 158*a*, 160*a* is sufficient to overcome the linear force and keep the cap 118*a* magnetically coupled to the first prong portion 94*a*.

During an impact situation, the magnetic force between the prong and cap magnets 158*a*, 160*a* is designed to be overcome to prevent damage to the robotic device 10. As such, the magnetic force between the prong and cap magnets 158*a*, 160*a* is sufficiently strong to maintain alignment between the cap 118*a* and the first prong portion 94*a* during normal operative forces (i.e., linear and rotational forces from the linear actuator 106*a*). However, the magnetic force between the prong and cap magnets 158*a*, 160*a* is sufficiently weak to cause the cap 118*a* and the first prong portion 94*a* to misalign during the impact situation, which is described in further detail below.

As best shown in FIG. 7, the cap 118*a* includes relief apertures 168*a*. The illustrated relief apertures 168*a* are aligned with the cap magnet retainers 166*a*. As such, each illustrated cap 118*a* includes four relief apertures 168*a* (shown in FIG. 3). The relief apertures 168*a* are configured to release air (e.g., from between prong and cap magnets 158*a*, 160*a*, within the cap magnet retainers 166*a*, etc.). The relief apertures 168*a* can also be used to remove one of the cap magnets 160*a* from the respective cap magnet retainer 166*a* (e.g., by pressurized air, a rigid tine, etc.).

With returned reference to FIG. 5, the gripper 54 is pivotably coupled to the wrist joint 50 by a dual-axis yoke 170. The gripper 54 is pivotable relative to the wrist joint 50 about both the roll axis Y and the pitch axis X. The illustrated yoke 170 includes a generally square-shaped peripheral wall 174. The peripheral wall 174 defines a generally square-shaped cavity 178. The cavity 178 is configured to receive the square-shaped lower portion 102 of the wrist joint 50. The yoke 170 includes a pair of first pivot bores 180 on opposing sides of the peripheral wall 174, which define the pitch axis X. The yoke 170 also includes a pair of second pivot bores 182 positioned on the other opposing sides of the peripheral wall 174, which define the roll axis Y. Each first pivot bore 180 receives a first pivot pin 186. Each first pivot pin 186 is also received by a base pivot bore 190 of the body 70. As such, the body 70 is pivotable about the pitch axis X relative to the end effector 58 by the first pivot pins 186. The pair of second pivot bores 182 receive a single second pivot pin 194. The second pivot pin 194 also extends through a central bore 198 in the lower portion 102 of the wrist joint 50 (FIG. 6). As such, the body 70 is pivotable about the roll axis Y relative to the end effector 58 by the second pivot pin 194.

The body 70 can rotate about the yaw axis Z together with the yoke 170, the end effector 58, and the lower portion 102 relative to the forearm 34. The body 70 can also rotate about the roll axis Y together with the yoke 170 relative to the end effector 58, the lower portion 102, and the forearm 34. The body 70 can further rotate about the pitch axis X relative to the yoke 170, the end effector 58, lower portion 102, and the forearm 34. In the illustrated embodiment, the yaw, roll, and pitch axes Z, Y, X intersect at a point located within the square-shaped cavity 178 of the yoke 170.

The linear actuators 106a, 106b are equally spaced apart from the pitch axis X on a same side thereof. The linear actuators 106a, 106b are also equally spaced apart from the roll axis Y on opposite sides thereof. As a result, various operations of one or both of the linear actuators 106a, 106b adjusts the orientation of the body 70 (and thus the gripper 54) relative to the pitch and/or roll axes X, Y.

Figure 8:
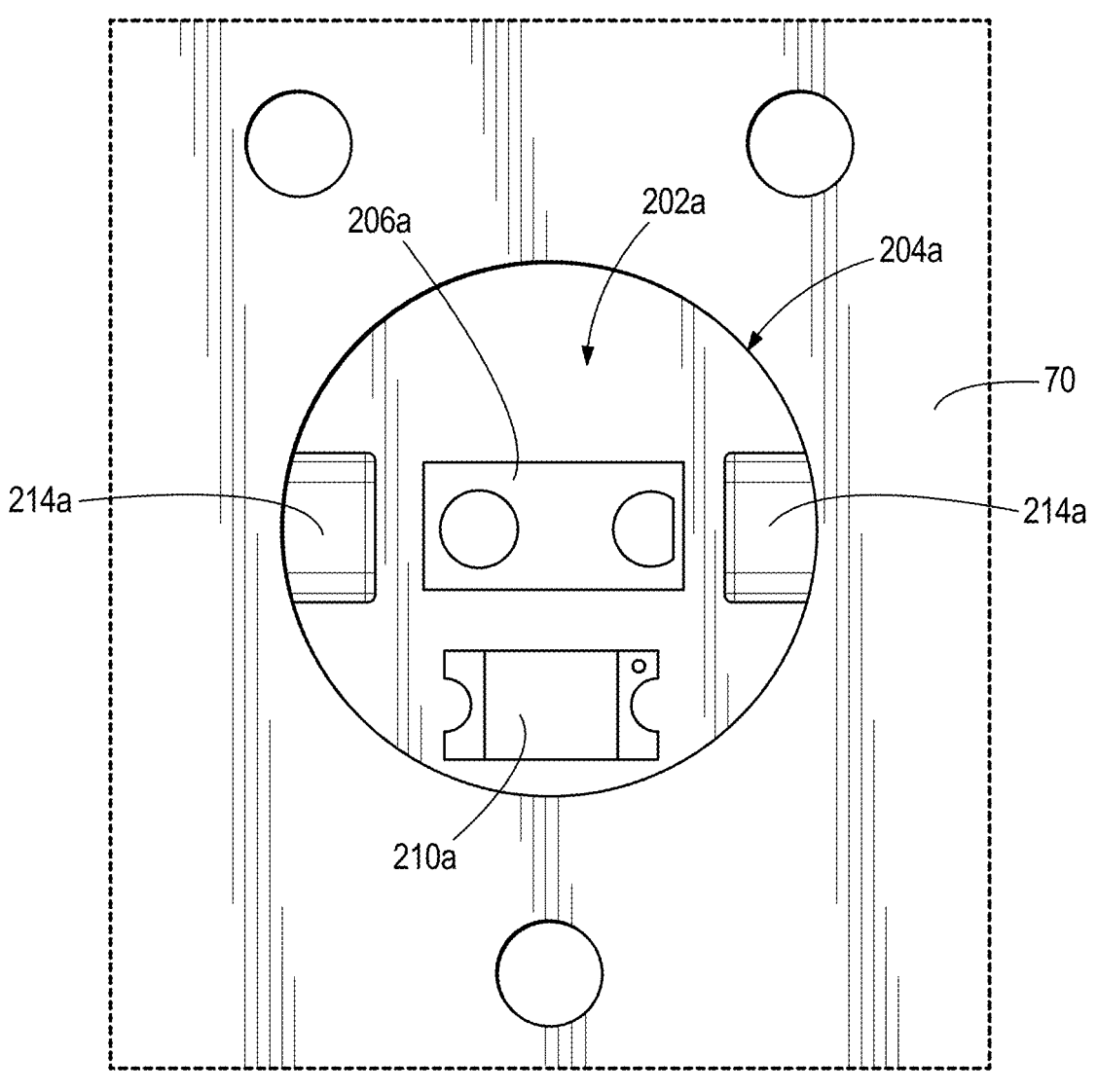
FIG. 8 is a perspective view of a portion of the wrist assembly of FIG. 2 illustrating a sensor assembly taken along line 8-8 of FIG. 5.

The gripper 54 includes a plurality sensor assemblies. Stated another way, the sensor assemblies are carried by the gripper 54. More specifically, the gripper 54 includes a first sensor assembly 202a on the first side 88a and a second sensor assembly 202b on the second side 88b. The sensor assemblies 202a, 202b are positioned within respective sensor recesses 204a, 204b. The sensor assemblies 202a, 202b and sensor recesses 204a, 204b are equally spaced apart from the pitch axis X on a same side thereof. The sensor assemblies 202a, 202b and sensor recesses 204a, 204b are also equally spaced apart from the roll axis Y on opposite sides thereof. With reference to FIG. 8, the first sensor assembly 202a includes the sensor 206a (e.g., a capacitive proximity sensor, a photoelectric proximity sensor, etc.). The illustrated sensor assembly 202a also includes a light 210a (e.g., an LED, a plurality of LED's, etc.) and a pair of capacitors 214a. The illustrated sensor 206a is aligned with the first prong portion 94a (shown in FIG. 5). The sensor 206a is configured to measure a distance to the first prong portion 94a. The second sensor assembly 202b is identical to the first sensor assembly 202a. As such, it should be appreciated that while the first sensor assembly 202a is shown in FIG. 7, it is also representative of the second sensor assembly 202b. In operation, the sensor assemblies 202a, 202b, and the associated sensors 206a, 206b, are in communication with the controller. The distance measured by each sensor 206a, 206b is sent to the controller to determine the position of the gripper 54 relative to the end effector 58. As the gripper 54 rotates about the pitch and roll axes X, Y, the sensors 206a, 206b and the controller are used to determine the orientation of the gripper 54. The sensors 206a, 206b and the controller are configured to determine if the robotic device 10 is operating within a predetermined operational range. The predetermined operational range is a range of operational conditions (e.g., angular rotations, linear movement, etc.) that is safe for operation. Stated another way, the robotic device 10 is not in danger of being damaged when the robotic device 10 operates within the predetermined operational range. If the sensors 206a, 206b detect the robotic device 10 operating outside of the predetermined operational range, operation of the linear actuators 106a, 106b is terminated.

During operation, the linear actuators 106a, 106b can be activated, such as by receipt of a signal sent from the controller to the motors 122a, 122b. In a first example, the linear actuators 106a, 106b can extend (or retract) the respective drive shafts 130a, 130b relative to the respective housings 126a, 126b in the same direction for the same distance. Stated another way, the linear actuators 106a, 106b can extend each drive shaft 130a, 130b into the respective housing 126a, 126b the same distance. Similarly, the linear actuators 106a, 106b can withdraw each drive shaft 130a, 130b into its respective housing 126a, 126b the same distance. This movement will facilitate rotation of the gripper 54 about the pitch axis X relative to the end effector 58. In some embodiments, the gripper 54 can be rotated about the pitch axis X in the predetermined operational range. For example, the predetermined operational range of pitch axis X rotation can be between −3° (−3 degrees) and +3° (+3 degrees) relative to the end effector 58.

In a second example, the linear actuators 106a, 106b can extend (or retract) the respective drive shafts 130a, 130b relative to the respective housings 126a, 126b in opposing directions for the same distance. Stated another way, one of the linear actuators 106a, 106b can extend the drive shaft 130a, 130b into its respective housing 126a, 126b the same distance. Alternatively, the other of the linear actuators 106a, 106b can withdraw the drive shaft 130a, 130b from its respective housing 126a, 126b the same distance. This movement will facilitate rotation of the gripper 54 about the roll axis Y relative to the end effector 58. In some embodiments, the gripper 54 can be rotated about the roll axis Y in the predetermined operational range. For example, the predetermined operational range of roll axis Y rotation can be between −3° and +3° relative to the end effector 58.

In a third example, the linear actuators 106a, 106b can extend (or retract) the respective drive shafts 130a, 130b relative to the respective housings 126a, 126b different distances. The drive shafts 130a, 130b can extend (or retract) in the same or opposing directions. As such, the movement of the linear actuators 106a, 106b provides controlled adjustment of the gripper 54 about both the pitch and roll axes X, Y.

In a fourth example, the wrist assembly 46 is rotated about the yaw axis Z by the wrist joint 50. The illustrated wrist assembly 46 can rotate 360° about the wrist joint 50. In some embodiments, the wrist assembly 46 can be rotated about the yaw axis Z in the predetermined operational range. For example, the predetermined operational range of yaw axis Z rotation can be between −180° and +180° relative to the forearm 34.

In a fifth example, the wrist assembly 46 is linearly actuated by the elevator 26. The illustrated wrist assembly 46 is linearly actuatable along a height defined by the size of the tower 18. The height of the tower 18 can define the predetermined operational range of linear movement.

In a sixth example, the wrist assembly 46 is rotated about the first vertical axis 22 by the tower 18. The illustrated tower 18 can rotate 3600 about the base 14. In some embodiments, the tower 18 can be rotated about the first vertical axis 22 in the predetermined operational range. For example, the predetermined operational range of first vertical axis 22 rotation can be between −180° and +180° relative to the base 14.

As the gripper 54 is rotated about one or more of the axes X, Y, Z and linearly actuated (by the elevator 26), the gripper 54 or the fingers 62 can unintentionally impact an object. As a nonlimiting example, the gripper 54 (and/or the fingers 62) can impact a microtiter plate (or another sizable object) in an environment of operation. Impacting the object can cause an impact force on the gripper 54, and associated components. As a nonlimiting example, the impact can be in an upward direction (i.e., the direction defined along the yaw axis Z from the lower portion 102 toward the upper portion 104). The impact force is undesirable, as it can cause damage to one or more components of the robotic device 10, such as the gripper 54, the wrist joint 50, the motors 122a, 122b, etc. To prevent damage to the robotic device 10, the magnetic force of the prong and cap magnets 158a, 160a is designed to be overcome in response to the impact force (also referred to as an external force), which generates an error state. Stated another way, the magnetic force of attraction between the prong magnets 158a and the cap magnets 160a are configured to be less than the impact force. Accordingly, in response to the impact force on the gripper 54 (or fingers 62), each cap magnet 160a is configured to decouple from the associated prong magnet 158a (or the first magnet 158a and the second magnet 160a decouple). As the prong and cap magnets 158a, 160a decouple, the cap 118a is configured to decouple (or pop-off) from the end effector 58. In response to the cap 118a being decoupled from the end effector 58, the gripper 54 is positioned out of operational alignment with the end effector 58. The sensors 206a, 206b can detect a change in distance between the gripper 54 and the end effector 58, and more specifically a distance that is outside of the predetermined operational range. In response, the controller is configured to shut down (or shut off or terminate operation of) at least the motors 122a, 122b to prevent potential damage. In some embodiments, the controller can shut down (or shut off or terminate operation of) one or more additional components or the entire robotic device 10.

After the cap 118a is decoupled from the end effector 58, the robotic device 10 is in an error state. During the error state, the robotic device 10 will not operate until the prong and cap magnets 158a, 160a are reengaged and the cap 118a is realigned with the end effector 58. To reengage the prong and cap magnets 158a, 160a, the cap 118a is returned into contact with the end effector 58 (e.g., by manual movement of the cap 118a toward the end effector 58, through the magnetic force, etc.). The magnetic force of the prong and cap magnets 158a, 160a will then cause the cap 118a to realign with the end effector 58. This causes the gripper 54 to realign with the end effector 58 to a position within a predetermined operational range. The sensors 206a, 206b will detect that the gripper 54 is aligned with and operatively coupled to the end effector 58. The controller will then remove the error state and will allow for operation of the robotic device 10 to resume.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A lab automation robot comprising:
   a base;
   a tower rotatably coupled to the base;
   an arm translatable relative to the tower;
   a forearm rotatably coupled to the arm; and
   a wrist assembly rotatably coupled to the forearm about a wrist joint, the wrist assembly including:
      an end effector including a first magnet;
      a cap including a second magnet, the second magnet configured to magnetically couple to the first magnet by a magnetic force;
      a gripper pivotably coupled to the end effector;
      a linear actuator carried by the gripper and configured to adjust a position of the gripper relative to the end effector, a portion of the linear actuator extends through the end effector and is coupled to the cap; and
      a sensor carried by the gripper and configured to detect an orientation of the gripper relative to the end effector, wherein in response to the first magnet and the second magnet decoupling, the sensor is configured to detect an orientation of the gripper relative to the end effector outside of a predetermined operational range and terminate operation of the linear actuator.

2. The lab automation robot of claim 1, wherein the first magnet is a first plurality of magnets, wherein the second magnet is a second plurality of magnets, and wherein the first and second pluralities of magnets magnetically couple the cap to the end effector.

3. The lab automation robot of claim 2, wherein the wrist assembly further includes a bearing partially received by the end effector and partially received by the cap.

4. The lab automation robot of claim 3, wherein the first plurality of magnets is evenly spaced around the bearing, and the second plurality of magnets is evenly spaced around the bearing.

5. The lab automation robot of claim 4, wherein the first plurality of magnets is configured to attract to the second plurality of magnets to align the cap relative to the end effector.

6. The lab automation robot of claim 3, wherein the bearing includes an outer race coupled to the cap and an inner race coupled to the linear actuator.

7. The lab automation robot of claim 1, wherein the linear actuator includes a housing, a bearing, and a drive shaft movable relative to the housing and received by the bearing, and wherein the bearing is received by an aperture partially defined by the cap and partially defined by the end effector.

8. The lab automation robot of claim 7, wherein
   the bearing is a first bearing,
   the linear actuator includes a second bearing coupled to the housing,
   the linear actuator defines a translation axis, and
   the translation axis is pivoted about the second bearing as the drive shaft moves relative to the housing.

9. The lab automation robot of claim 1, wherein the magnetic force is overcome by application of an external force on the gripper, and wherein the cap decouples from the end effector in response to the magnetic force being overcome.

10. The lab automation robot of claim 1, wherein the sensor is configured to measure a distance between the gripper and the end effector.

11. The lab automation robot of claim 10, further comprising a controller in communication with the sensor, wherein the controller is configured to receive the measured distance from the sensor and determine an orientation of the gripper relative to the end effector.

12. The lab automation robot of claim 11, wherein in response to the determined orientation of the gripper relative to the end effector, the controller is configured to determine whether the gripper is within or outside the predetermined operational range.

13. The lab automation robot of claim 12, wherein the linear actuator includes a motor, and wherein the motor is configured to shut off in response to the controller determining the gripper is outside the predetermined operational range.

14. A lab automation robot comprising:
   a wrist assembly configured to move in at least three directions, the wrist assembly including:
      an end effector;
      a gripper pivotably coupled to the end effector;
      a first linear actuator and a second linear actuator, the first and second linear actuators carried by the gripper;
      a first cap magnetically connected to the end effector, the first cap and end effector cooperatively define a first aperture, a portion of the first linear actuator is received by the first aperture;

a second cap magnetically connected to the end effector, the second cap and end effector cooperatively define a second aperture, a portion of the second linear actuator is received by the second aperture;

a sensor assembly carried by the gripper, the sensor assembly configured to detect an orientation of the gripper relative to the end effector; and a controller in communication with the sensor assembly, wherein in response to a detected orientation of the gripper relative to the end effector being outside of predetermined operational range, the controller is configured to terminate operation of the first and second linear actuators, wherein in response to the detected orientation of the gripper relative to the end effector being outside of a predetermined operational range at least one of the magnetic connection between the first cap and the end effector or the magnetic connection between the second cap and the end effector is decoupled.

15. The lab automation robot of claim 14, wherein the end effector includes a base, a first prong extending from the base, and a second prong extending from the base, the first cap and the first prong cooperatively define the first aperture, and the second cap and the second prong cooperatively define the second aperture.

16. The lab automation robot of claim 15, wherein the sensor assembly includes a first sensor positioned adjacent the first linear actuator and configured to detect a position of the first prong and a second sensor positioned adjacent the second linear actuator and configured to detect a position of the second prong.

17. The lab automation robot of claim 14, wherein the first linear actuator includes a first motor, the second linear actuator includes a second motor, and the controller shuts off the first and second motors in response to the detected orientation of the gripper relative to the end effector being outside of the predetermined operational range.

18. The lab automation robot of claim 14, wherein the first cap includes a plurality of first magnets and the end effector includes a plurality of second magnets, the first and second magnets being configured to attract to form the magnetic connection.

19. The lab automation robot of claim 14, wherein the second cap includes a plurality of first magnets and the end effector includes a plurality of second magnets, the first and second magnets being configured to attract to form the magnetic connection.

20. The lab automation robot of claim 14, wherein the predetermined operational range is the gripper being oriented relative to the end effector from −3 degrees to +3 degrees along at least one axis.

* * * * *